(12) United States Patent
Uhl et al.

(10) Patent No.: US 6,964,165 B2
(45) Date of Patent: Nov. 15, 2005

(54) SYSTEM AND PROCESS FOR RECOVERING ENERGY FROM A COMPRESSED GAS

(76) Inventors: Donald A. Uhl, 10 Wythe Dr., Downingtown, PA (US) 19335; Adolph DeMarco, 10 Wythe Dr., Downingtown, PA (US) 19335

( * ) Notice: Subject to any disclaimer, the term of this patent is extended or adjusted under 35 U.S.C. 154(b) by 46 days.

(21) Appl. No.: 10/789,769

(22) Filed: Feb. 27, 2004

(65) Prior Publication Data

US 2005/0188691 A1     Sep. 1, 2005

(51) Int. Cl.[7] .................................................. F03C 1/00
(52) U.S. Cl. ........................................... 60/495; 60/496
(58) Field of Search .................................. 60/495, 496

(56) References Cited

U.S. PATENT DOCUMENTS

| | | | |
|---|---|---|---|
| 2,470,312 A | 5/1949 | Levin | |
| 2,470,313 A | 5/1949 | Levin | |
| 3,777,494 A * | 12/1973 | Soderlund | ...................... 60/507 |
| 3,895,493 A | 7/1975 | Rigollot | |
| 3,961,479 A | 6/1976 | Anderson | |
| 4,179,886 A | 12/1979 | Tsubota | |
| 4,214,387 A * | 7/1980 | Boehme et al. | ................ 37/195 |
| 4,220,003 A | 9/1980 | Doi | |
| 4,282,070 A | 8/1981 | Egosi | |
| 4,301,377 A | 11/1981 | Rydz | |
| 4,316,361 A | 2/1982 | Hoar | |
| 4,362,120 A * | 12/1982 | Dekkers | ...................... 405/198 |
| 4,441,872 A | 4/1984 | Seale | |
| 4,455,824 A | 6/1984 | Dabringhaus | |
| 4,683,720 A | 8/1987 | De Shon | |
| 4,715,182 A | 12/1987 | Adams | |
| 4,726,188 A | 2/1988 | Woolfolk | |
| 4,730,119 A | 3/1988 | Biscomb | |
| 4,750,330 A | 6/1988 | Johnson | |
| 4,783,961 A | 11/1988 | Walters | |
| 4,792,290 A | 12/1988 | Berg | |
| 5,263,322 A | 11/1993 | Molini | |
| 5,384,489 A | 1/1995 | Bellac | |
| 5,443,361 A | 8/1995 | Skaarup | |
| 5,513,494 A | 5/1996 | Flynn et al. | |
| 5,582,691 A | 12/1996 | Flynn et al. | |
| 6,010,295 A * | 1/2000 | Sridhar | ..................... 414/138.5 |
| 6,018,947 A * | 2/2000 | DeMarco et al. | ............. 60/496 |
| 6,073,568 A * | 6/2000 | Finley | ....................... 114/61.1 |

* cited by examiner

*Primary Examiner*—Hoang Nguyen
(74) *Attorney, Agent, or Firm*—Knoble Yoshida & Dunleavy, LLC

(57) ABSTRACT

A process for extracting energy from a compressed gas includes of submerging a piston-cylinder assembly to a first, lower position, holding the assembly in the lower position while introducing a predetermined amount of compressed gas into the assembly, and then releasing the assembly. Pontoons are positioned so as to engage the piston assembly when it reaches the lower position. As the assembly rises, it is mechanically engaged with an endless chain, thereby causing the endless chain to move. The energy is then recovered from the endless chain by a sprocket that is engaged with the chain at a position that is remote from the piston-cylinder assembly. The system can be positioned in a man made tank, or in an open body of water. It is efficient, inexpensive, and can be designed to effect energy conversion over an extended period of time with a minimum of maintenance.

19 Claims, 7 Drawing Sheets

_US 6,964,165 B2_

SYSTEM AND PROCESS FOR RECOVERING ENERGY FROM A COMPRESSED GAS

BACKGROUND OF THE INVENTION

1. Field of the Invention

This invention relates primarily to the field of energy storage and conversion. More specifically, the invention relates to an improved system and process for recovering energy from a compressed gas, such as compressed air.

2. Description of the Related Technology

The limited supply of fossil fuel that is available and ecological concerns such as the greenhouse effect have increased demand for ever more efficient and clean ways to produce, store and convert energy from one form to another.

The literature is replete with energy storage and conversion technology, ranging from systems from recovering ocean wave and tidal energy to photovoltaic technology, to systems for storing energy, using such mediums as compressed air that are stored in old salt mines, and recovering the stored energy for use during peak periods. In systems that store energy as compressed air, the energy is usually recovered by means of a turbine that is coupled to an electrical generator. While this is fine for some applications, such as for large storage systems that are owned by an electrical utility company, such systems are relatively expensive, complex and expensive to maintain.

A need exists for a system and process for recovering energy from a source such as compressed air that is simple, inexpensive, efficient and is suited for smaller residential and industrial applications.

SUMMARY OF THE INVENTION

Accordingly, it is an object of certain embodiments of the invention to provide an improved to provide an apparatus for recovering energy from a compressed gas that includes a tank containing a liquid, the tank having a bottom end and a top end; a piston-cylinder assembly that is mounted for movement in the tank between a first position near the bottom end to a second position near the top end, the piston-cylinder assembly comprising a cylinder positioned in the tank; and a piston disposed in the cylinder and cooperating with the cylinder so as to define an expandable chamber therewith; a pontoon disposed in the tank to receive the piston-cylinder assembly; pressure coupling means, positioned proximate to the bottom of the tank, for introducing a compressed gas from a location outside the tank into the expandable chamber; and energy recovery means, connected to the piston-cylinder assembly, for recovering energy from the piston-cylinder assembly as the piston-cylinder assembly floats from the first position to the second position.

According to a second aspect of the invention, a process for extracting energy from a compressed gas includes steps of: (a) submerging a piston-cylinder assembly to a first, lower position wherein the piston-cylinder assembly rests on one or more pontoons; (b) holding the piston-cylinder assembly in the first, lower position while introducing a predetermined amount of compressed gas into the piston-cylinder assembly; (c) releasing the piston-cylinder assembly; (d) mechanically engaging the piston-cylinder assembly with an endless chain as the piston-cylinder assembly rises toward a second, upper position, thereby causing the endless chain to move; and (e) recovering energy from the endless chain by a sprocket that is engaged with the endless chain at a position that is remote from the piston-cylinder assembly.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1A:
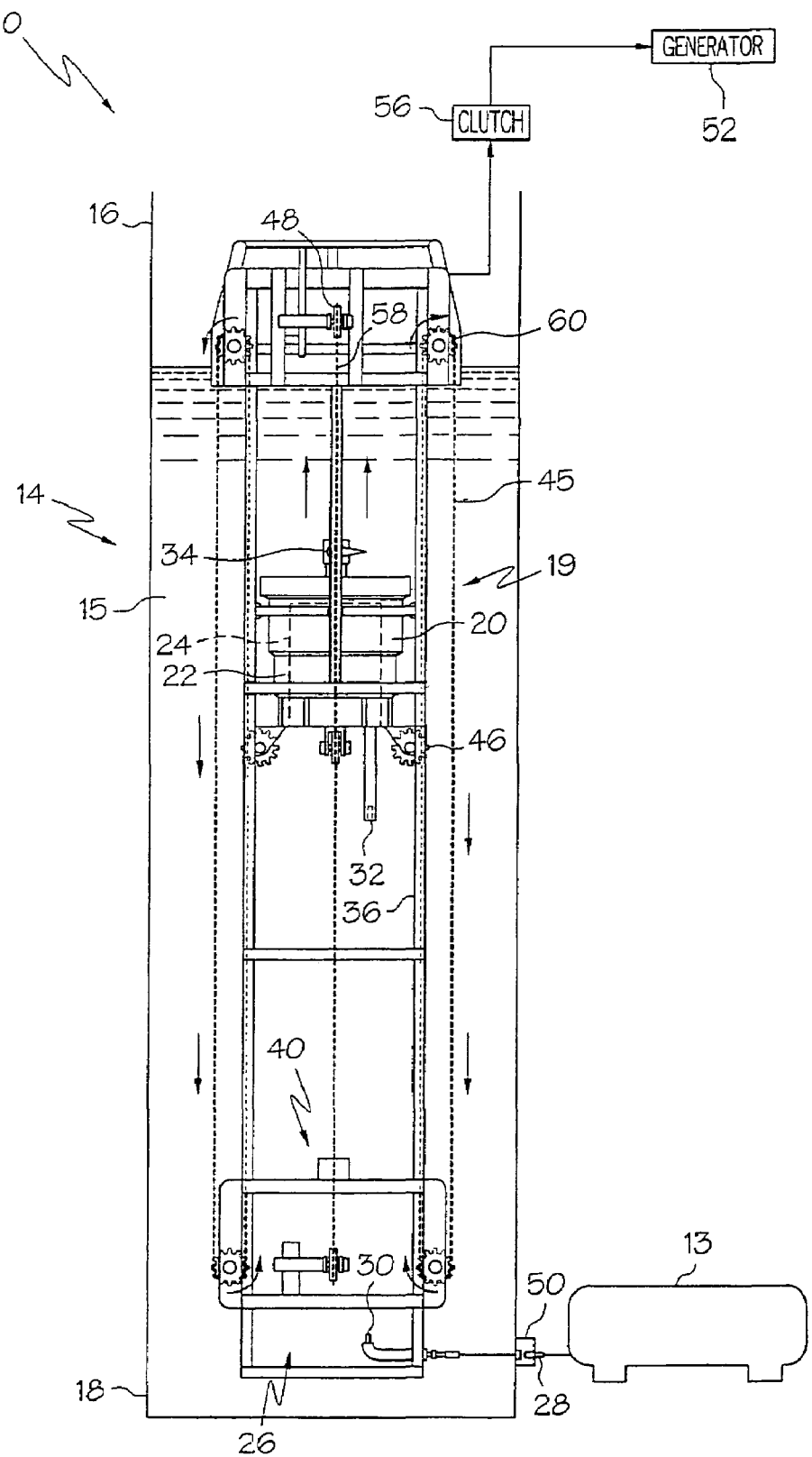
FIG. 1A is a diagrammatical view of a system constructed according to a first embodiment of the invention.
Figure 1B:
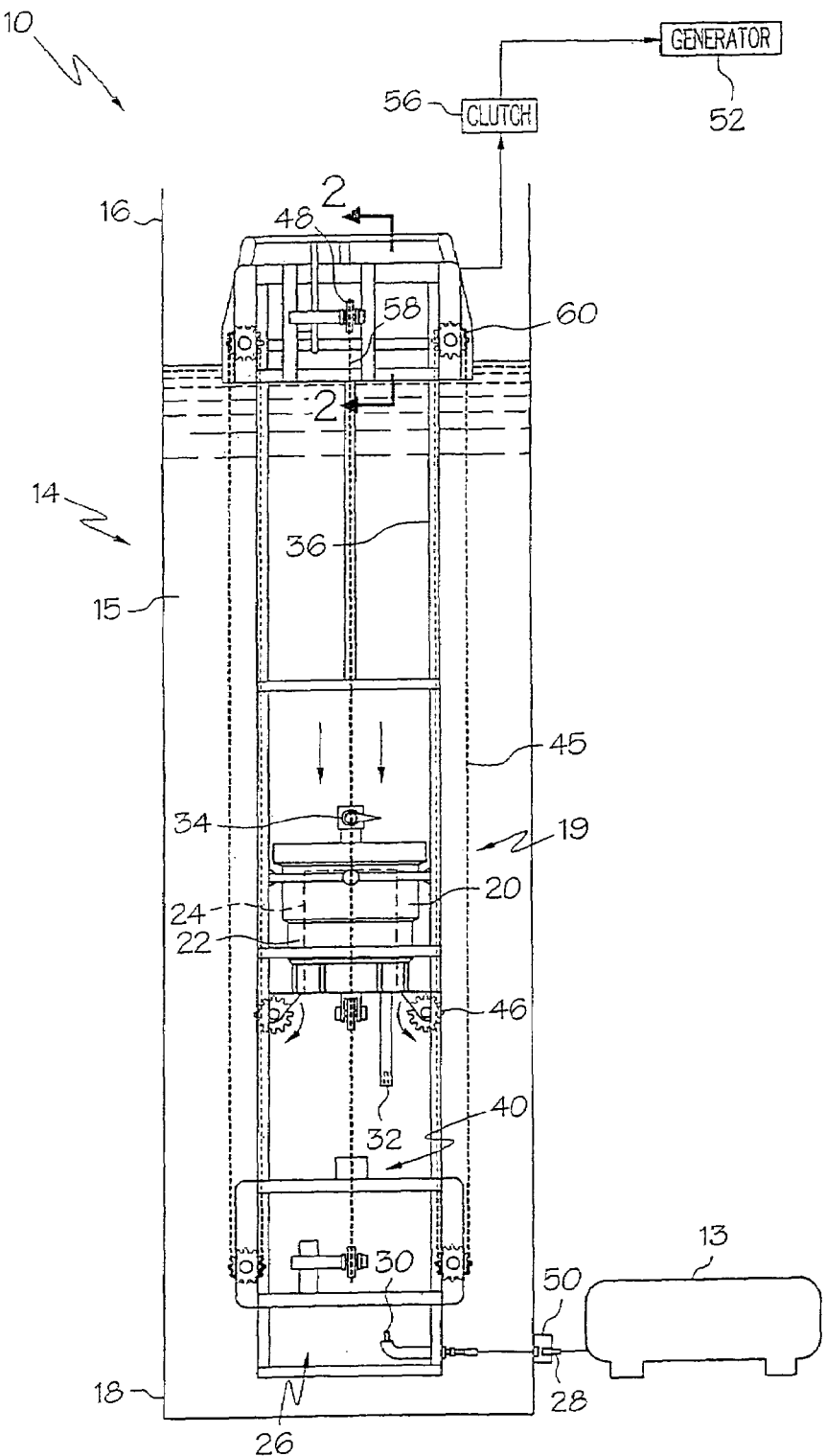
FIG. 1B is a diagrammatical view of a system constructed according to a first embodiment of the invention showing the assembly in a second position.
Figure 2:
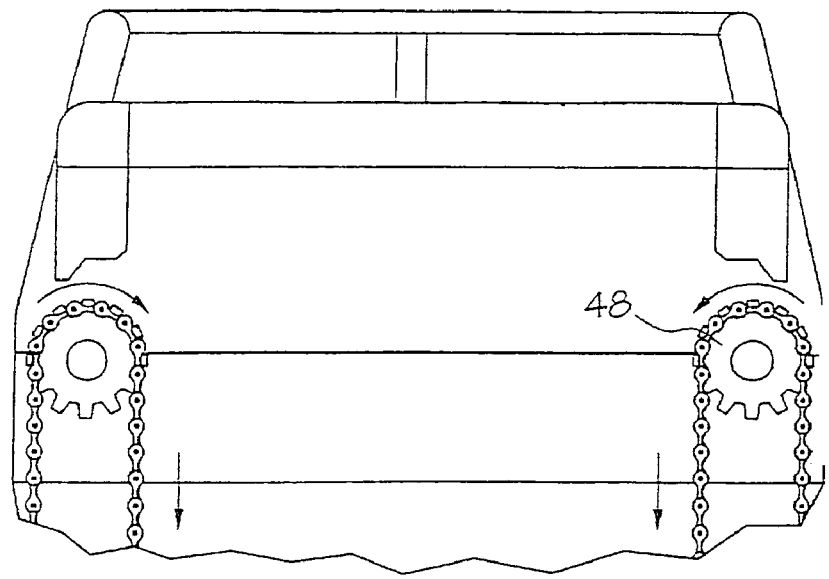
FIG. 2 is a fragmentary view depicting another portion of the system shown in FIG. 1.

Referring now to the drawings, wherein like reference numerals designate corresponding structure throughout the views, and referring in particular to FIG. 1, an apparatus 10 for recovering energy from a compressed gas includes a tank 14 containing a liquid 15. As may be seen in FIG. 1, tank 14 has a bottom end 18 and a top end 16. As is further shown in FIG. 1, apparatus 10 includes a piston-cylinder assembly 19 that it is made up a cylinder 20 that is positioned in the tank 14 and a piston 22 that is disposed in cylinder 20 and is positioned to cooperate with cylinder 20 so as to define an expandable chamber 24 with cylinder 20.

As may further be seen in FIG. 1, the apparatus 10 includes a pressure coupling system 26 that is positioned proximate to the bottom end 18 of the tank 14. The purpose of pressure coupling system 26 is to introduce a compressed gas from a source 13 that is positioned outside the tank 14. Pressure coupling system 26 includes a pressure line 28, a valve 50 that is interposed in the pressure line 28, and a nipple 30 that is positioned so as to couple with a corresponding fitting 32 on the piston cylinder assembly 19 when the piston cylinder assembly 19 reaches the bottom end 18 of tank 14, as will be described in greater detail below.

Apparatus 10 further includes an energy recovery system that is connected to the piston cylinder assembly 19 for recovering energy from the piston cylinder assembly 19 as the piston cylinder assembly 19 floats from a first position near the bottom end 18 to a second position near top end 16. In the illustrated embodiment, the energy recovery system includes a first pair of endless chains 45 that are adapted to engage a corresponding pair of sprockets 46 that are mounted to travel with the piston cylinder assembly 19. The first set of the endless chains 45 are mounted in such a manner that the chains 45 will rotate in a first direction, but not a second direction. Similarly, the sprockets 46 on the piston cylinder assembly 19 are ratcheted so that they firmly engage the endless chains 45 when the piston cylinder assembly 19 is floating upwardly, but spin without gaining attraction on the endless chains 45 when in the piston cylinder assembly 19 is sinking downwardly, in the manner that will be described greater detail below.

Apparatus 10 further includes a second set of endless chains 58 that, similarly to the arrangement that is shown in FIG. 1 with respect to the first set 45 of endless chains, are constructed and arranged to engage ratcheted sprockets that are mounted for travel with the piston cylinder assembly 19. The ratcheted sprockets engaging the second endless chains 58 gain traction on the chains 58 when the piston cylinder assembly 19 moves downwardly, but gain no traction when the piston cylinder assembly 19 moves upwardly. The second set of endless chains 58 are mounted on a number of sprockets 48, which are ratcheted to permit motion in one direction, but not another direction. Guides 36 are provided to secure engagement between the sprockets and the endless chains.

As a result, when the piston cylinder assembly 19 moves upwardly, the first set 45 of endless chains will rotate, while the second set 58 of the endless chains will not. When the piston cylinder assembly 19 is moving downwardly, the second set 58 of the endless chains will rotate, while the first set 45 of endless chains will not.

Referring again to FIG. 1, it will be seen that the system 10 further includes a lock down system 40 that is constructed and arranged to secure the piston cylinder assembly 19 when it reaches the lowermost extent of its travel within tank 14. In other words, lock down system 40 secures the piston cylinder assembly 19 in a position where the fitting 32 of the pressure coupling system 26 is communicated with the nipple 30.

Figure 3:
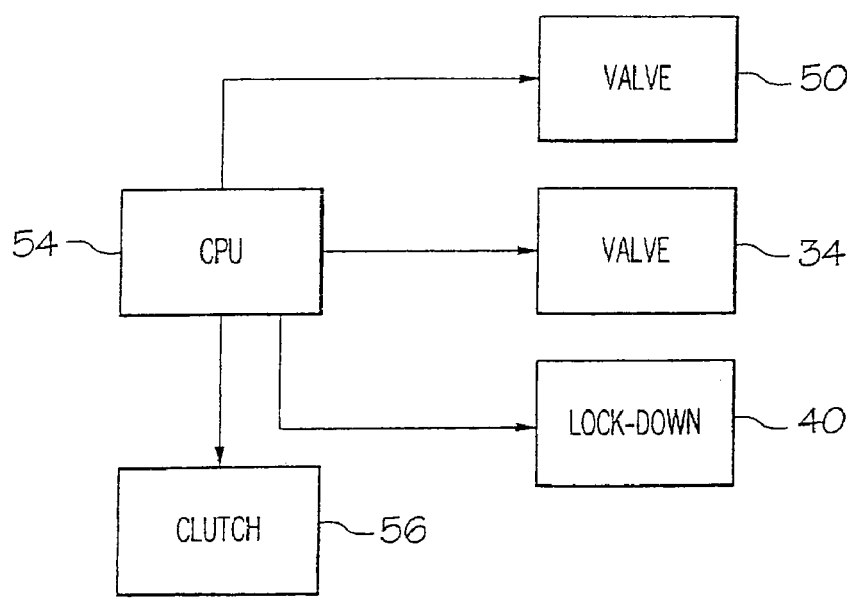
FIG. 3 is a schematic depiction of a control system for the system shown in FIGS. 1 and 2.

The energy recovery system further includes a mechanical transmission system that it is coupled to both the first and second sets of chains 45, 58, and further includes an electrical generator 52 that is coupled to the mechanical transmission by means of a clutch 56. A control system for the apparatus 10 is depicted schematically in FIG. 3. As may be seen in FIG. 3, the system includes a central processor 54 that is in communication with the valve 50 for controlling entry of compressed gas into the pressure coupler 26, the valve 34 allowing gas to escape from the expandable chamber 24, the lock down system 40, and the clutch 56.

In operation, the piston cylinder assembly 19 will begin initially at the bottom end 18 of tank 14, where it is secured in position by means of lock down system 40. At this point in time, a predetermined amount of compressed gas is introduced into the expandable chamber 24 by means of the pressure coupling system 26. Specifically, central processor 54 instructs valve 50 to open for a predetermined period of time. It is also possible for pressure sensors and/or other sensors to be used to collect information as to the amount of gas being introduced into the expandable chamber 24, and for those sensors to report such data to the central processor 54.

Subsequently, the processor 54 will instruct valve 52 to close, and further instructs lock down system 40 to release. The pistons cylinder assembly will begin to rise within the tank 14. As it rises, the pistons cylinder assembly will tend to extend, as the expandable chamber 24 increases in volume, as the gas volume adjusts in response to meet changing fluid pressure that is exerted by the water in tank 14. As a result, the force by which the piston assembly rises will tend to accelerate over its length of travel. The energy so created is captured by the first endless chain 45, and is transmitted to the generator 52 by means of the mechanical transmission shown schematically in FIG. 1. At this point in time, clutch 56 is engaged.

When the piston cylinder assembly 19 reaches the second, top position, the central processor 54 will instruct the valve 34 to open, thus releasing all of the gas from the expandable chamber 24, and expandable chamber 24 will collapse under it own weight so as to be reduced to as close to zero in volume as possible. The piston cylinder assembly 19 will, at this point, begin to sink under its own weight back toward the bottom 18 of tank 14. This energy is captured by the endless chains 58, and may also be converted into electricity by generator 52. Alternatively, clutch 56 can be disengaged at this point, if it is desired to let the piston cylinder assembly 19 sink more quickly, in order to repeat the upward stroke more quickly, which is used as expected to generate greater power.

In addition to the embodiment shown in FIG. 1, wherein the apparatus is positioned within a tank 14, the invention also has utility for use in bodies of water, such as lakes or the ocean.

Figure 4:
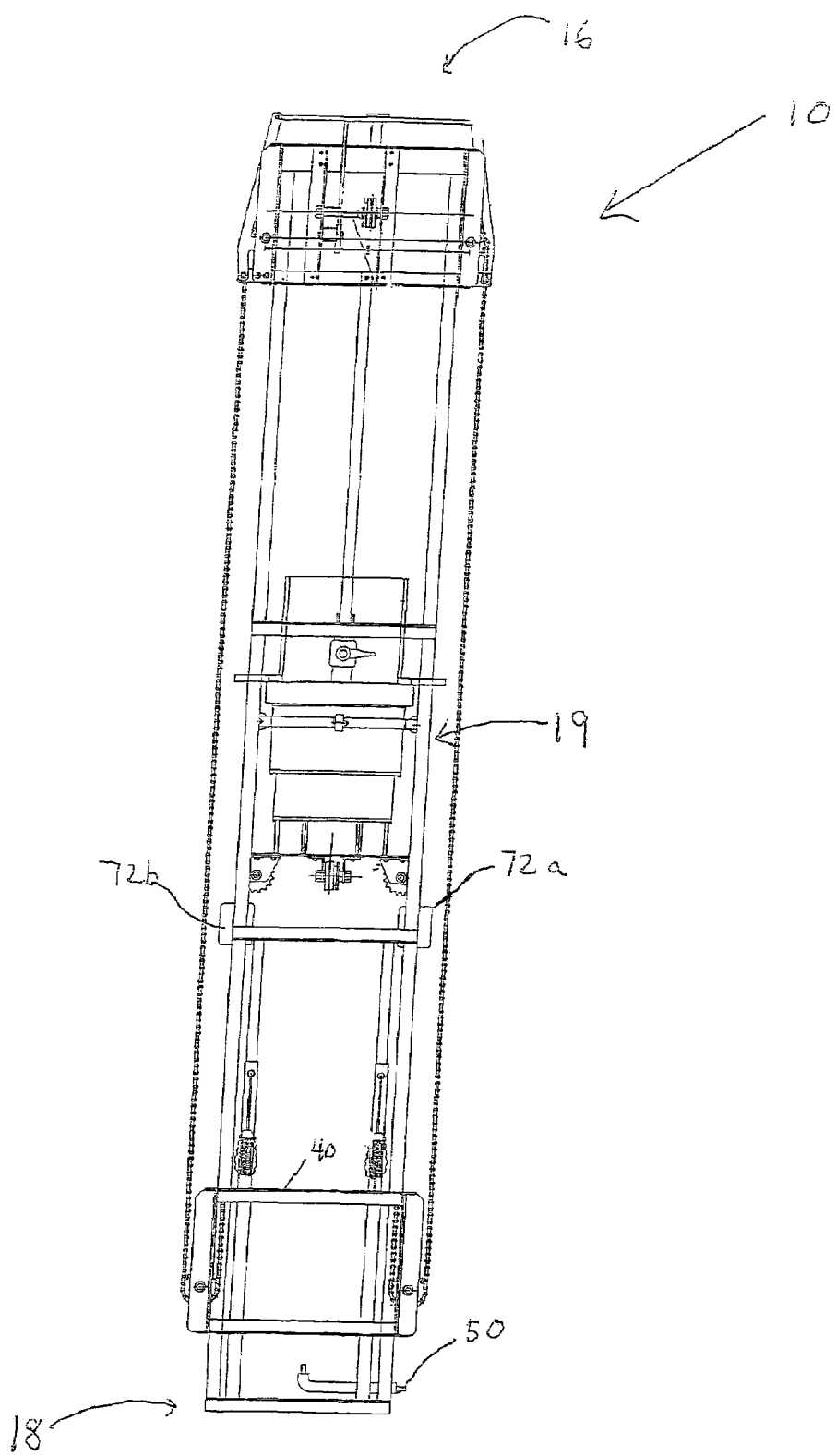
FIG. 4 is a diagrammatical view of a system showing pontoons and the spring assist cylinders.
Figure 5:
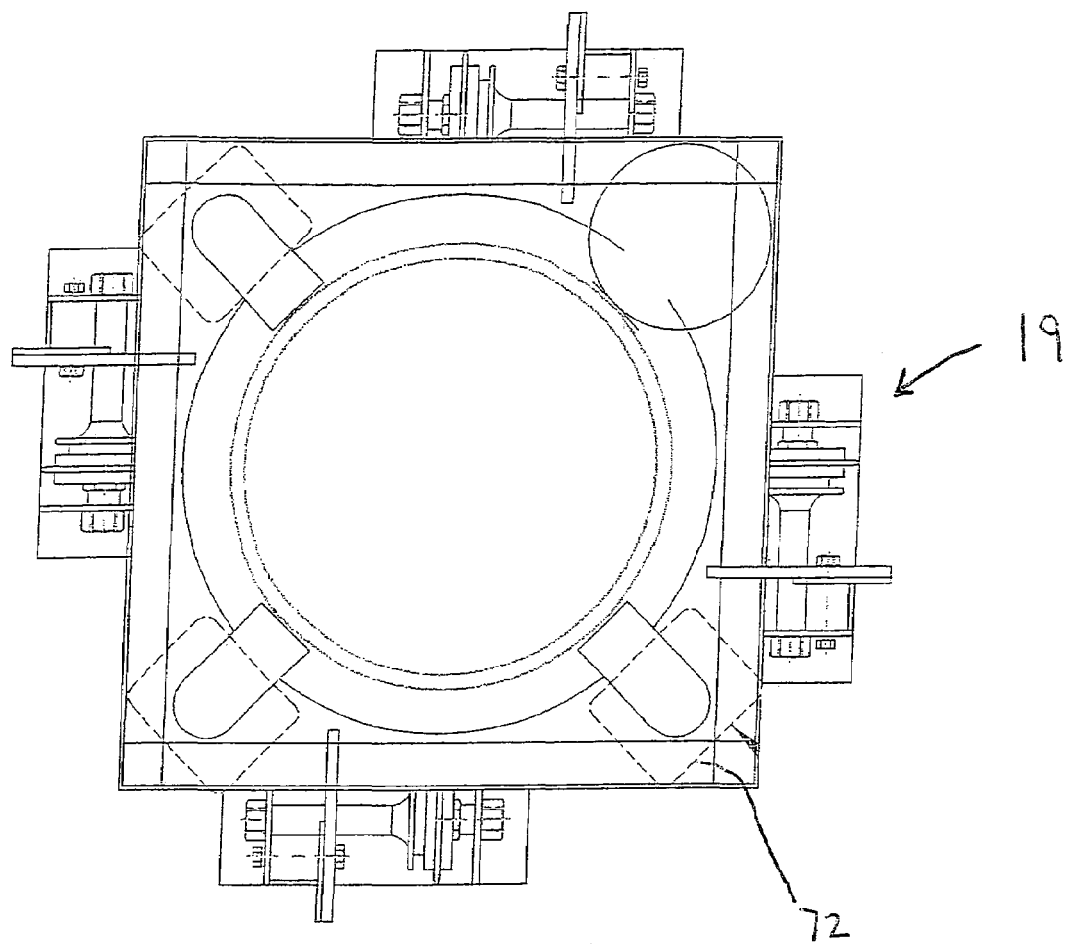
FIG. 5 is a top down view of the system showing the pontoons.
Figure 6:
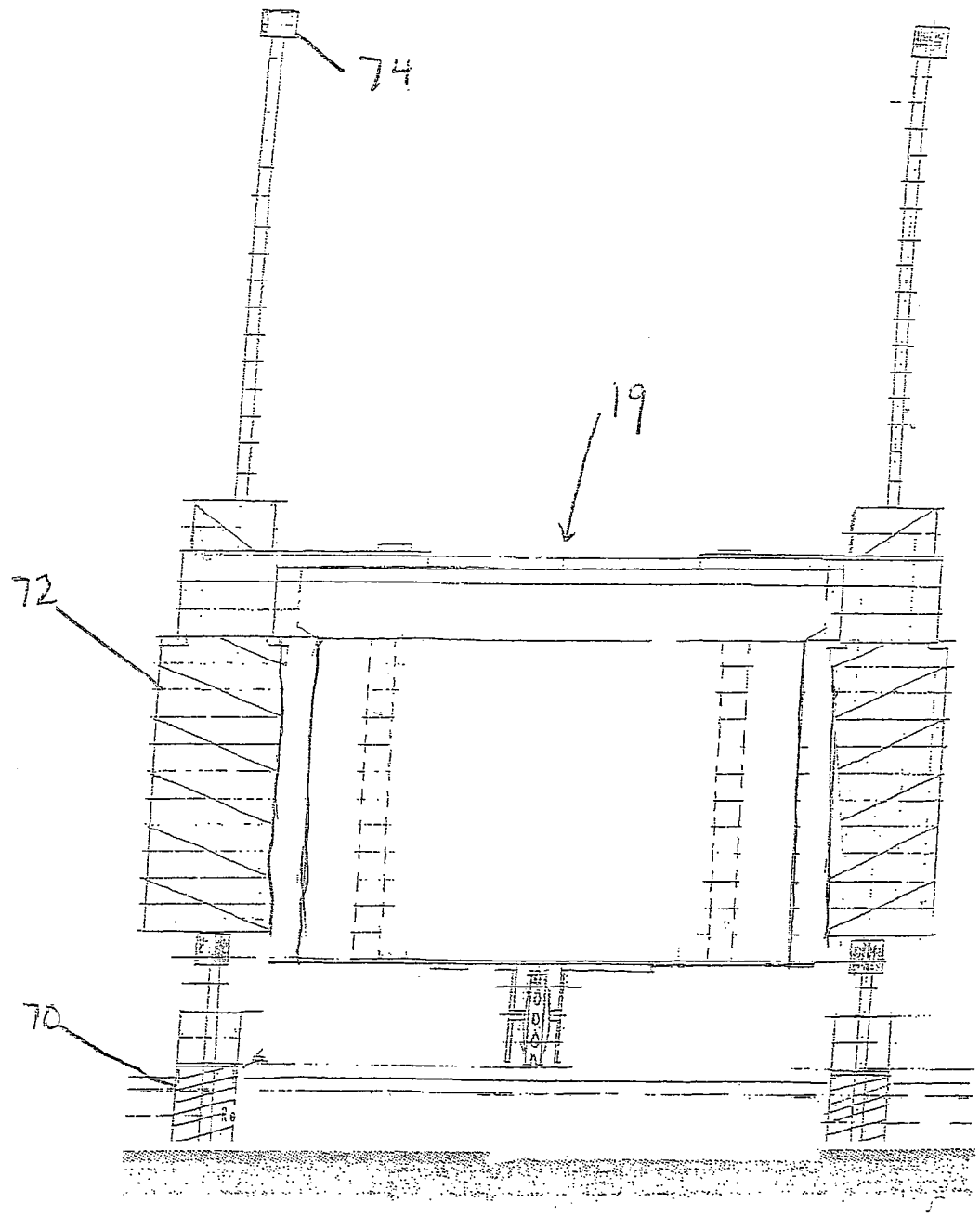
FIG. 6 is a diagrammatical view of a system according to another embodiment of the invention shown in a fully expanded position.

Another embodiment involves the use of pontoons and springs as shown in FIGS. 4–6.

FIG. 4, shows a view of the apparatus 10 that includes Pontoons 72*a*, 72*b*, and spring assist cylinders 70*a*, 70*b*. The system functions in the same manner as disclosed above, but this embodiment includes features that improve the efficiency of the system while also protecting the piston cylinder assembly 19. These features are discussed in detail below.

The system starts with piston cylinder assembly 19 in the locked position at surface (top) 16 with piston cylinder assembly 19 in the fully expanded position. The valve 50 is opened to allow the piston cylinder assembly 19 to compress under its own weight. The lock down system 40 is released allowing piston cylinder assembly 19 to sink to the bottom 18 coming to rest on four pontoons 72. The pontoons 72 can be filled with compressed gas in order to provide buoyancy. In the preferred embodiment each pontoon will compress 25 percent of the total weight of the upper section of the piston cylinder assembly 19. However, one or more pontoons 72 can be used in the system in a variety of configurations and/or sizes. One or more spring assist cylinders 70 are placed at the bottom as a safety device in case of pontoon failure.

When the piston cylinder assembly 19 sinks completely the lock down system 40 is engaged. Air is pumped into the bottom of the piston cylinder assembly 19 causing it to expand with assistance from the pontoons 72. Piston cylinder assembly's 19 length is controlled by the spring assist cylinders 70 which will not allow the piston cylinder assembly 19 to over extend. When air is pumped into the piston cylinder assembly 19 and it starts to expand, pontoons 72 assist in the raising of the piston cylinder assembly 19. Due to the assistance of pontoons 72 less air pressure is required to expand the remaining part of piston cylinder assembly 19.

When the piston cylinder assembly 19 is begins to expand, t lock down system 40 is released allowing the piston cylinder assembly 19 to rise to the surface with the assistance of the 4 pontoons 72. When the piston cylinder assembly 19 reaches the surface the lock down system 40 is engaged.

FIG. 5, shows a top down view of the piston cylinder assembly 19 as shown in FIG. 4. Pontoons 72 are located at the corners.

FIG. 6, shows another embodiment of the system when piston cylinder assembly 19 is in the fully expanded position. In this embodiment, pontoons 72 assists with raising piston cylinder assembly 19. Pontoons 72 can be filled with compressed gas in order to provide them with buoyancy in a liquid environment. Alternatively, pontoons 72 may be constructed of a material that has buoyancy in water. Pontoon stops 74 are placed above piston cylinder assembly 19 location in the collapsed position and prevent pontoon 72 from traveling too far when piston cylinder assembly 19 is moving to the fully expanded position. More than one pontoon stop 74 can be used. Pontoon stops 74 prevent pontoons 72 from rising completely.

Figure 7:
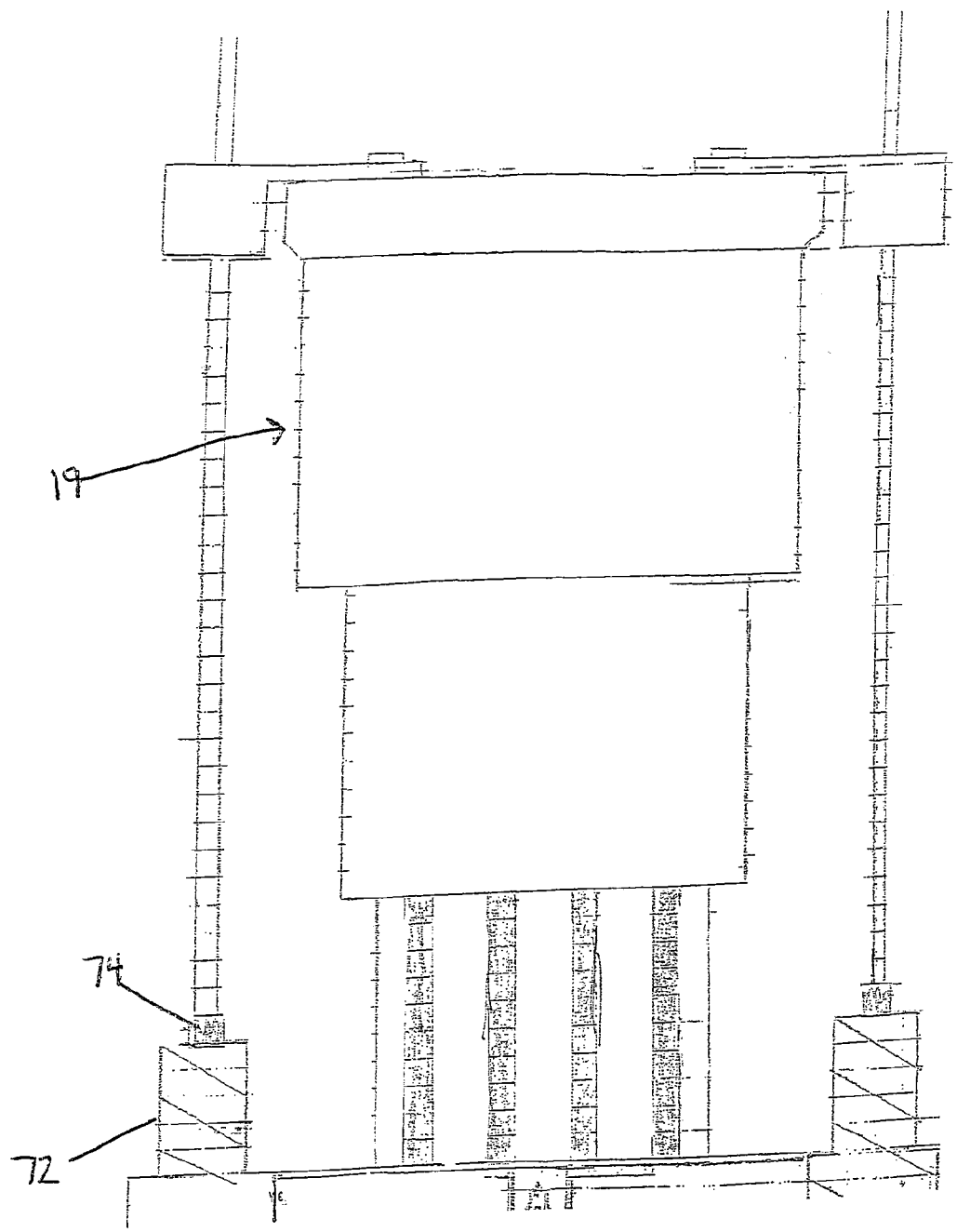
FIG. 7 is a diagrammatical view of the system shown in FIG. 6 in a collapsed position.

FIG. 7, shows the embodiment shown in FIG. 6 when piston cylinder assembly 19 is in the collapsed position. Spring assist cylinder 70 is located below piston cylinder assembly 19. Pontoon stops 74 are shown located above piston cylinder assembly 74. Pontoons 72 are shown engaged with piston cylinder assembly 19. When piston cylinder assembly 19 is prepared to move to the expanded position shown in FIG. 6, pontoons 72 assist in the moving piston cylinder assembly 19 to the expanded position. As piston cylinder assembly 19 and pontoons 72 rise, pontoons 72 engage pontoon stops 74 and halt pontoons 72 progress while piston cylinder assembly 19 continues to rise to the fully expanded position shown in FIG. 6.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An apparatus for recovering energy from a compressed gas, comprising:
    a piston-cylinder assembly that is mounted for movement in a body of water between a first lower position and a second upper position, said piston-cylinder assembly comprising;
    a cylinder positioned in said tank; and
    a piston disposed in said cylinder and cooperating with said cylinder so as to define an expandable chamber therewith;
    a pontoon disposed in said tank to receive the piston-cylinder assembly;
    pressure coupling means, positioned proximate to said lower position, for introducing a compressed gas into said expandable chamber; and
    energy recovery means, connected to said piston-cylinder assembly, for recovering energy from said piston-cylinder assembly as said piston-cylinder assembly floats from said first position to said second position, and wherein said energy recovery means is further constructed and arranged to recover additional energy from said piston-cylinder assembly as said piston-cylinder assembly returns by sinking to said first position.

2. An apparatus according to claim 1, further comprising a spring assist cylinder.

3. An apparatus according to claim 1, further comprising a pontoon stop.

4. An apparatus according to claim 1, wherein the pontoon is filled with compressed gas.

5. An apparatus according to claim 1, further comprising a valve for releasing said gas from said expandable chamber when said piston-cylinder assembly is close to said second position, whereby said piston-cylinder assembly is enabled to sink downwardly to return to said first position.

6. An apparatus according to claim 1, further comprising guide means for guiding said piston-cylinder assembly as it travels between said first and second positions.

7. An apparatus according to claim 1, further comprising lock-down means for holding said piston-cylinder assembly near said first position until a predetermined amount of compressed gas is introduced into said expandable chamber.

8. An apparatus according to claim 1, wherein said energy recovery means further comprises an electrical generator.

9. An apparatus for recovering energy from a compressed gas, comprising:
    a piston-cylinder assembly that is mounted for movement in a body of water between a first lower position and a second upper position, said piston-cylinder assembly comprising a cylinder positioned in said tank; and a piston disposed in said cylinder and cooperating with said cylinder so as to define an expandable chamber therewith and at least one pontoon disposed in said tank to receive the piston-cylinder assembly;
    pressure coupling means, positioned proximate to said lower position, for introducing a compressed gas into said expandable chamber; and
    energy recovery means, connected to said piston-cylinder assembly, for recovering energy from said piston-cylinder assembly as said piston-cylinder assembly floats from said first position to said second position, and wherein said energy recovery means comprises at least one endless chain mounted for travel in an endless loop between a first sprocket near said first position and a second sprocket near said second position, and means on said piston-cylinder assembly for engaging said chain.

10. An apparatus according to claim 9, further comprising a spring assist cylinder.

11. An apparatus according to claim 9, further comprising a pontoon stops.

12. An apparatus according to claim 9, wherein the pontoon is filled with compressed gas.

13. An apparatus according to claim 9, wherein said energy recovery means further comprises an electrical generator coupled to said second sprocket.

14. A process for extracting energy from a compressed gas, comprising steps of:
    (a) submerging a piston-cylinder assembly to a first, lower position wherein the piston-cylinder assembly rests on one or more pontoons;
    (b) holding said piston-cylinder assembly in said first, lower position while introducing a predetermined amount of compressed gas into said piston-cylinder assembly;
    (c) releasing the piston-cylinder assembly;
    (d) mechanically engaging said piston-cylinder assembly with a first endless chain as said piston-cylinder assembly rises toward a second, upper position, thereby causing said first endless chain to move;
    (e) recovering energy from said first endless chain
    (f) mechanically engaging said piston-cylinder assembly with a second endless chain as said piston-cylinder assembly sinks toward the first, lower position, thereby causing the second endless chain to move; and
    (g) recovering additional energy from the second endless chain position to said second position.

15. A process according to claim 14, wherein one or more spring assist cylinders engage the pontoons.

16. A process according to claim 14, wherein one or more pontoon stops engage the pontoons.

17. A process according to claim 14, further comprising a step of converting the energy recovered in step (e) into electricity by means of an electrical generator.

18. A process according to claim 14, wherein steps (a)–(d) are performed within a tank.

19. A process according to claim 14, wherein steps (a)–(d) are performed within a body of water.

* * * * *